United States Patent [19]

Moon et al.

[11] 4,141,737
[45] Feb. 27, 1979

[54] METHOD OF PREVENTING SURFACE CRACKING OF PORTLAND CEMENT MORTAR AND CONCRETE CONTAINING A FILM FORMING POLYMER MODIFIER

[75] Inventors: Tag Y. Moon, Midland; Ronald H. Cooper, Clare, both of Mich.

[73] Assignee: The Dow Chemical Company, Midland, Mich.

[21] Appl. No.: 838,328

[22] Filed: Sep. 30, 1977

Related U.S. Application Data

[63] Continuation-in-part of Ser. No. 703,997, Jul. 9, 1976, abandoned.

[51] Int. Cl.$^2$ ................................................ C08L 1/28
[52] U.S. Cl. ........................................ 106/12; 106/90; 260/29.6 S; 427/136
[58] Field of Search ............... 106/12, 314, 90, 315, 106/13; 260/29.6 S; 264/79; 428/384; 427/136

[56] References Cited

U.S. PATENT DOCUMENTS

| | | | |
|---|---|---|---|
| 2,225,146 | 12/1940 | Bechtold | 106/90 |
| 2,307,741 | 1/1943 | Goldstein et al. | 106/90 |
| 3,663,251 | 5/1972 | Moren et al. | 106/90 |
| 3,779,971 | 12/1973 | Isenburg et al. | 260/29.6 S |
| 3,814,619 | 6/1974 | Kobayashr | 427/387 |
| 3,895,953 | 7/1975 | Mehta | 106/88 |

FOREIGN PATENT DOCUMENTS 1195077 6/1970 United Kingdom ............... 106/12

*Primary Examiner*—Theodore Morris

[57] ABSTRACT

A method for preventing surface cracking of a portland cement mortar or concrete containing a film-forming polymeric modifier, comprising applying onto a fresh, non-cured mortar or concrete surface a substantially continuous coating comprising from about 0.06 to about 1 lb/yd$^2$ of said mortar or concrete surface of a material selected from the group consisting of polyglycerine, glycerine and mixtures thereof.

4 Claims, No Drawings

METHOD OF PREVENTING SURFACE CRACKING OF PORTLAND CEMENT MORTAR AND CONCRETE CONTAINING A FILM FORMING POLYMER MODIFIER

CROSS-REFERENCE TO RELATED APPLICATION

This application is a continuation-in-part of copending application Ser. No. 703,997, filed July 9, 1976 now abandoned.

BACKGROUND OF THE INVENTION

It has been found that upon curing of a portland cement mortar or concrete composition containing a film-forming polymeric modifier, e.g. a polymer latex, a three-dimensional network of polymeric film is formed throughout such material. This film seals the material and prevents the evaporation of moisture therefrom by buffering such composition from the deleterious effects of low humidity, wind and excessive temperatures. Under extreme drying conditions, such as high wind and/or high temperature combined with low humidity conditions, the modified concrete may develop crazing or random surface cracking approximately one-tenth to one-half of an inch deep. Such cracking is believed to be caused by the following sequence of events: (1) the surface layer of the latex modified cement mortar or concrete loses water rapidly through surface evaporation, (2) coalescence of the polymer modifier (latex) is induced by drying causing the polymer in the surface layer to form a film network before the cement paste, which is the matrix of such network, has had a chance to develop mechanical strength through the hydration reaction, (3) the hydration reaction proceeds to a point wherein the cement paste phase undergoes volume shrinkage exerting tensile stress, and (4) since the polymer modifier has already formed a network in the surface layer and resists shrinkage stress, when the stress exceeds the tensile strength of the polymer network such stress is relieved by cracking of the surface layer.

While numerous liquid curing membranes have been proposed to prevent the excessive loss of moisture from portland cement mortar and concrete compositions, none of these compounds have proven to perform satisfactorily with a portland cement mortar or concrete composition containing a film-forming polymeric modifier. The primary reason for such failure is that all existing curing compounds are designed to be applied after the initial set of the portland cement mortar or concrete surface. This occurs primarily because most of the compositions contain a water-immiscible solvent which is incompatible with free water on the surface. In polymer modified portland cement mortar or concrete, however, the crack begins to form before the initial set.

It is, therefore, a primary object of the present invention to provide a means for the prevention of surface cracking of portland cement mortar or concrete containing a film-forming polymeric modifier.

SUMMARY OF THE INVENTION

The above and related objects are obtained by a method comprising applying onto the surface of a fresh, non-cured portland cement mortar or concrete containing a film-forming polymeric modifier of from about 0.06 to about 1 lb/yd$^2$ of said concrete or mortar surface of a compound selected from the group consisting of polyglycerine, glycerine and mixtures thereof.

It is believed that the advantages described herein are attributable to the ability of the prescribed coating materials to retard rapid coalescence of the film-forming polymeric compound contained in the portland cement mortar or concrete so as to prevent premature formation of the polymeric film layer.

DESCRIPTION OF THE PREFERRED EMBODIMENTS

Exemplary of portland cement mortar or concrete compositions containing film-forming polymeric modifiers, which compositions are applicable in the practice of the present invention, are those specific compositions described in U.S. Pat. No. Re. 28,722 (reissue of U.S. Pat. Nos. 3,043,790), 3,228,907 and 3,239,479. More particularly, preferred polymer modifiers used herein are polymer latexes wherein the polymer constituent is a copolymer of styrene-butadiene-1,3 having a styrene to butadiene weight ratio of about 30:70 to 70:30 and, more particularly, such polymer latexes containing, based on the weight of the styrene-butadiene copolymer, (a) 2–10 percent of nonionic surfactant, (b) 1–7.5 percent of anionic surfactant, at least 15 percent of which is a sodium alkyl sulfate in which the alkyl group contains 9–17 carbon atoms, and (c) 0.1–5 percent of polyorganosiloxane fluid surfactant, the sum of (a) and (b) not exceeding about 11 percent by weight of said copolymer and the weight ratio of (a) and (b) being within the range of about 0.7:1 to 10:1. Other preferred polymeric modifiers are polymer latexes containing an interpolymer where vinylidene chloride is present in proportions of about 50 to about 90 percent by weight being interpolymerized with about 50 to about 10 percent by weight of at least one interpolymerizable material composed of at least one monomer having the general formula:

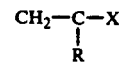

$$CH_2{=}C{-}X \\ \phantom{CH_2{=}C{-}}R$$

wherein "R" is hydrogen or the methyl group and "X" is selected from the group consisting of —CN, halogens, of atomic numbers 9–35, and ester forming groups —COOY, wherein "Y" is a primary or secondary alkyl group containing up to and including 18 carbon atoms.

It is to be understood, however, that the method of the present invention is applicable to any portland cement mortar or concrete system containing a film-forming polymeric modifier, which system would be compatible with the treatment of the present invention.

The coating compounds applicable in the practice of the present invention are selected from the group consisting of polyglycerine, glycerine and mixtures thereof. These compounds are humectants for polymeric latex coatings, i.e., they act to prevent premature drying of the polymer latex coating prior to the setting of the cement base. Such compounds are also miscible with water and as such are capable of penetrating the water phase of the latex, thereby preventing rapid latex particle coalescence.

The coating compounds may be applied to the cement mortar or concrete surface by any convenient means. A preferred method of application, however, comprises spraying such compounds onto the cement mortar or concrete surface in the form of a water miscible composition containing at least about 80 weight percent of the prescribed coating compound. In this regard, suitable diluents for such sprayable compositions include water; alcohols such as methanol, ethanol, ispropanol; and glycols such as ethylene glycol.

The coating compounds contemplated herein may also be admixed with conventional pigments and/or dyestuffs if desired, In this regard, pigments are generally used in concentrations of less than about 5 weight percent based on the weight of the coating compound; and dyestuffs are generally used in concentrations of less that about 10 ppm based on the weight of the coating compound. Such compounds may also be admixed with small amounts of humectants such as calcium chloride.

The rate of application of the prescribed coating materials on the finished polymer latex-modified portland cement mortar or concrete surface is about 0.06 to about 1 lb/yd$^2$ of cement mortar or concrete surface, preferably from about 0.2 to about 0.5 lb/yd$^2$, which incidentally, covers the range of thickness of fresh paint when brushed or sprayed on. These values are converted into alternative units in the following table.

TABLE I.

| | CONVERSION | |
|---|---|---|
| Thickness (thousandth of an inch) | Coverage (ft.$^2$/gallon) | Dosage* (lb./yd$^2$) |
| 1 | 1600 | 0.06 |
| 3 | 500 | 0.20 |
| 8 | 200 | 0.50 |
| 16 | 100 | 1.00 |

*for a liquid formulation of specific gravity about 1.3

The invention is further illustrated by the following examples.

EXAMPLE 1 — CONTROL (FOR COMPARISON)

A concrete plate (100 sq. inches of surface) composed of a portland cement modified with a latex containing 67 weight percent styrene/33 weight percent butadiene/2 weight percent anionic surfactant/5 weight percent nonionic surfactant (having a latex to cement ratio of 0.15 and a water to cement ratio of 0.37) was exposed to a temperature of 120° F., a 20% relative humidity, and a wind velocity of about 10 mph for a period of 24 hours. Weight losses due to the evaporation of water from the concrete plate were calculated after being exposed to these conditions for certain periods of time. After 30 minutes exposure 21.1 grams of water had evaporated. 29.1 grams had evaporated after 1 hour; 41.2 grams after a 3 hour period, and 50.3 gram loss was realized after 24 hours. Surface cracks started to appear at about 15 minutes after mortar had been finished.

EXAMPLE 2 — CONTROL (FOR COMPARISON)

Another concrete plate was exposed to the same conditions outlined above. This plate, however, was modified with a polymer latex blend containing a butadiene-styrene copolymer and a 75 percent vinylidene chloride/20 percent vinylchloride/3 percent ethyl acrylate/-2 percent methyl methacrylate interpolymer latex dispersion. The latex to cement and water to cement ratios were the same. Water losses of 20.2, 27.2, 37.9, and 47.3 grams were realized at 1/2, 1, 3, and 24 hour time intervals along with surface cracking of the cement plate.

EXAMPLE 3 — THE INVENTION (POLYGLYCERINE)

By way of comparison, a concrete plate having the same constituents as Example 1 was exposed to the same conditions. This plate, however, was coated with 0.15 lb/yd$^2$ of surface of an 80% polyglycerine solution in water to prevent water loss and surface cracking. After 1/2 hour a water loss of only 9.2 grams was realized, followed by water losses of 14.5, 30.0, and 49.5 grams at the 1, 3 and 24 hour time intervals. No cracking was observed in the plate.

EXAMPLE 4 — THE INVENTION (POLYGLYCERINE)

Under the same conditions, a plate having the same cement composition as Example 2 was coated with 0.23 lb/yd$^2$ of surface of the polyglycerine solution of Example 3. Here weight losses of 9.5, 15.6, 31.0, and 59.0 grams were experienced with no surface cracking occuring.

EXAMPLE 5 — THE INVENTION (GLYCERINE)

A plate as in Example 1, coated with 0.10 lb/yd$^2$ of surface of 96% glycerine was exposed to the same conditions as above. Weight losses of 11.4, 22.4, 39.8, and 57.3 grams were experienced with no surface cracking occurring.

EXAMPLE 6 — THE INVENTION (GLYCERINE)

A plate as in Example 1 was coated with 0.15 lb/yd$^2$ of surface of 90% glycerine. Weight losses of 9.3, 16.6, 36.6, and 52.7 grams were experienced with no surface cracking occurring.

EXAMPLE 7 — THE INVENTION (GLYCERINE)

A plate as in Example 2 was coated with 0.23 lb/yd$^2$ of surface of 90% glycerine. Weight losses of 8.6, 13.5, 27.5, and 56.9 were experienced with no surface cracking occurring.

EXAMPLE 8 — THE INVENTION (GLYCERINE)

A plate as in Example 2 was coated with 0.46 lb/yd$^2$ (1% by weight) of surface of 90% glycerine. Weight losses of 3, 9, 27 and 53 grams were experienced at one-half, 1, 1½ and 24 hour intervals, respectively, with no evidence of surface cracking.

EXAMPLE 9 — FOR COMPARISON

A concrete plate was prepared as set forth in Example 8 except that the glycerine was admixed into the cement formulation, instead of being sprayed onto the preformed plate. After one half hour, a water loss of 18 grams was realized, followed by water losses of 26, 37, and 58 grams at 1, 1 ½ and 24 hour time intervals. Surface cracking of the cement plate was observed following the initial 15 minutes of exposure.

This example illustrates that the required results of the present invention cannot be obtained by addition of glycerine to the cement mix.

EXAMPLE 10 — FOR COMPARISON

By way of further comparison, the cement formulation of Example 1 was mixed with IPANEX (curing compound marketed by IPA Systems, Inc.) at 1% by weight of cement according to IPA recommendations. Weight losses of 23.4, 32.0, 45.3, and 56.1 grams were experienced with surface cracking occurring.

EXAMPLE 11 — FOR COMPARISON

A cement plate as in Example 1 was coated with 0.15 lb/yd² of surface of Methocel ® E-15. Weight losses of 20.9, 37.8, 56.8, and 66.5 grams were experienced with surface cracking occurring.

EXAMPLE 12 — FOR COMPARISON

A cement plate as in Example 1 was coated with 0.16 lb/yd² of surface of a 33% calcium chloride (CaCl₂) solution. Weight losses of 19.0, 30.0, 62.7, and 85.8 grams were experienced with surface cracking occurring.

EXAMPLE 13 — FOR COMPARISON

A cement plate as per Example 1 was coated with 0.13 lb/yd² of surface of 1-octadecanol (10% in ethanol). Weight losses of 13.1, 35.9, 61.4 and 73.4 were experienced with surface cracking occurring.

What is claimed is:

1. A method for preventing surface cracking of portland cement mortar or concrete containing a film forming polymeric modifier, the mortar or concrete being subjected to extreme drying conditions such as high wind and/or high temperature combined with low humidity conditions, the method comprising applying onto a fresh, non-cured mortar or concrete surface a substantially continuous coating of from about 0.06 to about 1 lb/yd² of said surface of a material selected from the group consisting of polyglycerine, glycerine and mixtures thereof, the coating contains at least 80 weight percent polyglycerin, glycerin or mixtures thereof and up to 20 weight percent of a diluent selected from the group water, methanol, ethanol, isopropanol and glycols.

2. The method of claim 1 wherein said film-forming polymeric modifier is a polymer latex.

3. The method of claim 2 wherein said polymer latex contains a copolymer of styrene-butadiene-1,3 having a styrene to butadiene weight ratio of about 30:70 to 70:30.

4. The method of claim 2 wherein said polymer latex contains an interpolymer wherein vinylidene chloride is present in proportions of about 50 to about 90 percent by weight being interpolymerized with about 50 to about 10 percent by weight of at least one interpolymerizable material composed of at least one monomer having the general formula:

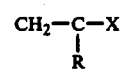

wherein "R" is hydrogen or the methyl group and "X" is selected from the group consisting of —CN, halogens of atomic numbers 9–35, and ester forming groups —COOY, wherein "Y" is a primary or secondary alkyl group containing up to and including 18 carbon atoms.

* * * * *